Patented Sept. 10, 1935

2,014,198

UNITED STATES PATENT OFFICE 2,014,198

CHEMICAL PRODUCT AND PROCESS OF PREPARING SAME

Elmer K. Bolton and Oliver M. Hayden, Wilmington, Del., assignors to E. I. du Pont de Nemours & Company, Wilmington, Del., a corporation of Delaware No Drawing. Application October 7, 1933, Serial No. 692,620

4 Claims. (Cl. 106—23)

This invention relates to rubber compositions and methods for preparing the same, and in particular it relates to the use of comparatively small amounts of higher aliphatic alcohols in dispersing carbon black in rubber.

One object of this invention relates to the production of rubber compositions and rubber articles by the use of carbon black together with higher aliphatic alcohols, the alcohols acting as agents for dispersing the carbon black in the rubber mix. A more specific object of the invention resides in the use of normal straight-chain monohydric aliphatic primary alcohols having eight or more carbon atoms in an amount of 1% to 3% of the carbon black introduced into the rubber mix. Other objects will appear hereinafter.

Carbon black is one of the best known ingredients used in rubber compositions and it serves to impart to the rubber great strength and abrasion resistance and also serves as a pigment for the rubber. One of the problems, however, in dealing with carbon black in this connection is that of properly dispersing the carbon black in the rubber. By the use of the higher alcohols described in accordance with the present invention, the carbon black is dispersed in rubber far more thoroughly, rapidly, and efficiently than where prior art dispersing agents are used, and in addition the finished rubber articles produced thereby show a remarkable increase in abrasion resistance and in other beneficial properties when compared with articles produced by a process not involving alcohol of this character.

The following examples which are to be considered as illustrative only, embody preferred methods for utilizing the invention:

Masterbatch A

A masterbatch was prepared according to conventional methods, having the following composition:

| | Parts by weight |
|---|---|
| Smoked sheets | 100 |
| Carbon black | 66.7 |
| Lauryl alcohol | 1.4 |

The carbon black used in the above composition was a channel black and is a product that is commonly used in the compounding of pneumatic tire treads.

The lauryl alcohol was the commercial product obtained by the catalytic hydrogenation of palm kernel oil and consisted substantially of lauryl alcohol together with much smaller amounts of myristyl alcohol and the other alcohols having from 12 to 18 carbon atoms.

The following additional masterbatch to the ingredients necessary to vulcanize the above masterbatch was prepared and had the following composition:

Masterbatch B

| | Parts by weight |
|---|---|
| Smoked sheets | 31 |
| 10 percent di-ortho-tolyl-guanidine | 10 |
| Zinc oxide | 5 |
| Sulfur | 3.25 |

The two masterbatches were blended on a rubber mill with the mill rolls heated to 70° C. by means of a hot water circulation system. The masterbatches were blended in the following proportions:

| | Parts by weight |
|---|---|
| Masterbatch A | 101.4 |
| Masterbatch B | 49.25 |

The blended mix may be rewritten with the ingredients in the following proportions:

| | Parts by weight |
|---|---|
| Smoked sheets | 100 |
| Zinc oxide | 5 |
| Carbon black | 40.25 |
| Di-ortho-tolyl-guanidine | 1 |
| Sulfur | 3.25 |
| Lauryl alcohol | 0.8 |

It will be noted that approximately 2% of the dispersing agent, lauryl alcohol, was used, based on the weight of the carbon black.

Slabs 6" x 6" x 0.085" were vulcanized for 40 minutes at 40 pounds steam pressure and at 141.5° C. and were tested on a Scott testing machine for tensile, stress strain and for elongation at break. Abrasion buttons for the abrasion test were vulcanized 45 minutes at 40 pounds steam pressure and were prepared and tested on the Williams abrasion machine according to the procedure outlined in Industrial and Engineering Chemistry, June 1927, page 674. The same proportions of ingredients and the same general procedure as is given in the above example were followed, using instead of lauryl alcohol other alcohols. The results obtained for the various dispersing agents may be summarized as follows:

| Dispersing agent used | Milling time (min.) | Abrasion loss—cc. per HP. hr. | Relative abrasion resistance | Stress at 500% elong. | Tensile at break | Elong. at break |
|---|---|---|---|---|---|---|
| No dispersing agent | 7 | 260 | 100 | 3075 | 4400 | 630 |
| Stearic acid | 6 | 258 | 101 | 2900 | 4450 | 650 |
| Stearyl alcohol | 5 | 183 | 142 | 3125 | 4650 | 620 |
| Cetyl alcohol | 6 | 191 | 136 | 3125 | 4575 | 640 |
| Oleyl alcohol | 7 | 196 | 132 | 3075 | 4700 | 650 |
| Lauryl alcohol | 6 | 202 | 128 | 3050 | 4450 | 620 |

The stearic acid listed in the above table is a dispersing agent well known and commonly used in the prior art. The above table illustrates the remarkable increase in abrasion resistance, maintenance of tensile strength and of elongation at break when using the higher alcohols such as lauryl, cetyl, oleyl and stearyl as compared with the prior use of stearic acid and as compared with the use of no dispersing agent.

The higher alcohols which are preferred in carrying out the present invention are the normal straight-chain monohydric primary aliphatic alcohols having eight or more carbon atoms, and either saturated or unsaturated, for example those given in the above table. The broad scope of the invention will include, however, the branch chain primary alcohols having eight or more carbon atoms, many of which are prepared in substantial amounts during the catalytic hydrogenation of carbonic oxides. Among the alcohols which may be used in accordance with this invention are palmityl, melissyl, carnaubyl, myristyl geranyl, linalyl, citronellyl, neryl, undecylenyl, heptadienyl, 4-methylheptanol-1, 2,5-dimethylhexanol-3 and 2,4-dimenthylheptanol-1.

The amount of alcohol used may vary from that given in the above example but must be kept substantially within the limits of 1% to 3% alcohol based on the amount of carbon black used. The proportion of carbon black and of the other ingredients may of course be varied from the formula given above but will ordinarily be within the range of from 25% to 50% of the amount of rubber present in the mix.

The alcohol may be incorporated in the mix in several different ways. It may, for example, be added by "sweating" it onto the pigment from a suitable solution and then removing the solvent from the pigment by evaporation, or it may be directly incorporated with the rubber on the rolls, previous to the addition of the pigment, or the pigment may be treated with the alcohol in the vapor phase, whereby the vapors of the alcohol are adsorbed onto the pigment. This latter method of incorporating the alcohol is applicable to other pigments than carbon black, e. g., lithopone, Titanox, zinc oxide, etc., and pigments thus treated are more readily dispersed not only in rubber, but also in oil-type compositions.

The above description and specific examples are to be taken as illustrative only. Any departure therefrom which conforms to the spirit of the invention is intended to be included within the scope of the claims.

We claim:

1. A rubber composition containing carbon black and an open chain aliphatic alcohol of at least eight carbon atoms, the amount of alcohol being within the range of 1–3% of the amount of carbon black.

2. A rubber composition containing carbon black and a normal primary alcohol of at least eight carbon atoms, the amount of alcohol being within the range of 1–3% of the amount of carbon black.

3. A rubber composition containing carbon black and a normal primary monohydric alcohol having from 12 to 18 carbon atoms, the amount of alcohol being within the range of 1–3% of the amount of carbon black.

4. A rubber composition containing carbon black and lauryl alcohol, the amount of alcohol being within the range of 1–3% of the amount of carbon black.

ELMER K. BOLTON.
OLIVER M. HAYDEN.